United States Patent [19]

Duncan

[11] Patent Number: 5,646,200
[45] Date of Patent: Jul. 8, 1997

[54] COMPOSITIONS CONTAINING ZIRCONIUM COMPOUNDS

[75] Inventor: Robert Hume Duncan, Stockton on Tees, England

[73] Assignee: Tioxide Specialties Limited, United Kingdom

[21] Appl. No.: 492,825

[22] Filed: Jun. 20, 1995

[30] Foreign Application Priority Data

Jun. 22, 1994 [GB] United Kingdom ............... 9412579

[51] Int. Cl.$^6$ ............................ C09D 5/00; C09D 11/00
[52] U.S. Cl. ....................... 523/160; 523/161; 524/413
[58] Field of Search ............................. 523/160, 161; 524/413; 106/24 B, 26 R, 26 A, 30 R

[56] References Cited

U.S. PATENT DOCUMENTS 5,021,596  6/1991  Barfurth et al. .................. 556/55

FOREIGN PATENT DOCUMENTS 2161817  1/1986  United Kingdom .

*Primary Examiner*—Paul R. Michl
*Assistant Examiner*—U. K. Rajguru

[57] ABSTRACT

A printing ink comprises a polymeric binder, a solvent and an adhesion promoting agent which is the reaction product of a zirconium orthoester and ethyl acetoacetate in which the molar ratio of zirconium to ethyl acetoacetate is from 1:1 to 1:4. Preferably, the inks are based on nitrocellulose or an ester type modified cellulose. The inks have been found to have adhesion and heat stability properties similar to inks containing titanium acetylacetonate but the zirconium additives have a much reduced tendency to discolor the ink.

18 Claims, No Drawings

COMPOSITIONS CONTAINING ZIRCONIUM COMPOUNDS

This invention relates to compositions containing zirconium compounds and particularly to compositions of use as printing inks.

The use of organic titanium compounds as adhesion promoting agents for inks based on binders such as nitrocellulose and ester-modified cellulose is known. Generally, however, only one product, usually called titanium acetylacetonate, has been shown to produce inks having satisfactory adhesion and heat stability when used on modern films such as coextruded polypropylene. However, this compound is innately coloured and can therefore discolour white inks. Under certain circumstances an undesirable odour can be produced in reels of printed film.

An ink containing an alternative adhesion promoting agent based on titanium organophosphorus compounds is disclosed in British Patent Application GB 2 161 817A. These titanium compounds do have a reduced tendency to colour inks and to produce undesirable odours in the printed film. However, generally, inks produced using these titanium-phosphorus compounds have a poorer adhesion and heat stability than those containing titanium acetylacetonate. Consequently, despite its well-known drawbacks, titanium acetylacetonate continues to be used widely as an adhesion promoting agent for printing inks.

Surprisingly, it has now been shown that certain zirconium derivatives of beta-diketones can be used to produce printing inks in which the adhesion and heat stability properties are similar to those containing titanium acetylacetonate but in which the disadvantages related to the use of titanium acetylacetonate are overcome.

According to the invention a printing ink comprises a polymeric binder, a solvent therefor and an adhesion promoting agent comprising the reaction product of a zirconium orthoester and ethyl acetoacetate in which the molar ratio of zirconium to ethyl acetoacetate is from 1:1 to 1:4.

The inks of the current invention which are of particular interest are the flexographic and gravure inks in which the polymeric binder is cross-linkable and is dissolved in an appropriate organic solvent therefor. Typical binders used in such inks are those based on nitrocellulose or ester type modified cellulose, such as cellulose acetate propionate. Frequently such polymeric binders are used in conjunction with other polymeric binders such as polyamides, polyurethanes or other resins.

When nitrocellulose is used as a binder it preferably has a low nitrogen content, for example 10.7 to 11.2 percent nitrogen by weight. Generally the nitrocellulose is damped with an alcohol such as isopropyl alcohol or industrial methylated spirits.

The solvent used in the printing ink can be any solvent for the polymeric binder. Typically, for nitrocellulose and other cellulose-based binders, alcohols such as isopropanol, n-propanol and ethanol or esters such as ethyl acetate and n-butyl acetate are used.

The adhesion promoting agent is a reaction product of a zirconium orthoester and ethyl acetoacetate (ethyl 3-oxo-butanoate). The zirconium orthoester can be represented by the formula $Zr(OR)_4$ in which R represents a hydrocarbyl or substituted hydrocarbyl group. Preferably, R represents an alkyl group or an alkoxyalkyl group containing up to 8 carbon atoms. More preferably, R contains up to 4 carbon atoms. Suitable zirconium orthoesters include tetraisopropoxy zirconium, tetra-n-propoxy zirconium, tetra-n-butoxy zirconium, tetrakis(2-ethoxyethoxy)zirconium and mixed orthoesters such as n-propoxy-, n-butoxy zirconium.

The adhesion promoting agent is the reaction product of a zirconium orthoester and ethyl acetoacetate in which the molar ratio of zirconium to ethyl acetoacetate is from 1:1 to 1:4. Preferably, the molar ratio is from 1:1.5 to 1:3 and, most preferably, it is from 1:2 to 1:2.5.

Generally speaking the adhesion promoting agent can be prepared by mixing the zirconium orthoester and the ethyl acetoacetate in appropriate proportions in any order. Usually, the reaction is carded out without heating and with stirring. An alcohol is produced as a by-product and this may be removed if desired. However, when the alcohol is compatible with the polymeric binder, it is not usually removed. A solvent may also be present to assist the mixing of the zirconium orthoester and ethyl acetoacetate and this may be allowed to remain with the reaction product if it is compatible with the other system components.

The inks of the present invention usually contain the adhesion promoting agent in an amount up to 10 percent by weight based on the total weight of ink. Preferably the adhesion promoting agent is present in an amount of from 1 to 6 percent by weight and more preferably from 2 to 4 percent by weight based on the total weight of ink.

The ink also usually contains one or more pigments or one or more dyes and typical pigments are coloured or white inorganic pigments or coloured organic pigments. Organic dyes can be used to render the ink an appropriate colour and often are used in conjunction with an opacifying white inorganic pigment such as titanium dioxide. A pigment or a dye is, however, not an essential feature of the present invention.

Other conventional ink additives such as slip aids and plasticisers may also be present in the ink.

The adhesion and heat stability properties of the inks of the current invention on substrates such as polyethylene or co-extruded polyethylene/polypropylene films or sheets have been found to be similar to inks containing titanium acetylacetonate and much better than those containing compounds of titanium or zirconium with other beta-diketones. Furthermore, the adhesion promoting agents of the current invention have a much reduced tendency to cause the ink to discolour compared to titanium acetylacetonate.

The invention is illustrated by the following examples.

EXAMPLE 1

To a round bottomed flask equipped with a stirrer, condenser and dropping funnel and containing 440 g of tetra-n-propyl zirconate there was slowly added from the funnel 260 g of ethyl acetoacetate. The contents were stirred with the flask in a cooling bath until the addition was complete.

An ink was made from the following ingredients in a ball mill.

|  | parts by weight |
|---|---|
| Nitrocellulose (70% in IMS) (DLX3/5)[1] | 11.54 |
| Polyurethane resin (Unithane 672S70)[2] | 11.43 |
| TiO$_2$ pigment (TIOXIDE R-TC90)[3] | 24.82 |
| Dicyclohexyl phthalate | 8.82 |
| Industrial Methylated Spirits | 20.68 |
| Propan-2-ol | 3.46 |
| Ethyl acetate | 19.25 |
|  | 100.00 |

[1]Imperial Chemical Industries plc
[2]Cray Valley Products Ltd.
[3]Tioxide Europe Ltd.

To 100 parts by weight of the above ink there was added 3 parts by weight of the reaction product prepared as above.

The ink containing the additive was used to prepare a printed strip of co-extruded oriented polypropylene film and for comparison a similar ink without added reaction product was used to print an adjacent area of the strip. A sticky tape (5.0 cm wide) was applied to the printed strip to contact both ink surfaces and pressure was applied to ensure good contact.

The tape was then quickly removed from both inks simultaneously and a visual inspection made of the strip. It was apparent that little or no ink containing the organozirconium compound was removed whereas virtually all the unmodified ink was removed by the sticky tape.

Samples of co-extruded film printed with both inks were folded printed side innermost. Films were placed between the heated jaws of a laboratory heat sealer under a pressure of 0.17 MPa for 1 second dwell time at a jaw temperature of 160° C. Films were removed, opened out and inspected for ink transfer. It was clear that less modified ink had been transferred compared to the unmodified ink.

EXAMPLE 2

An organozirconium compound was prepared in a manner similar to that described in Example 1 but using 440 g of tetra-n-propyl zirconate and 390 g of ethyl acetoacetate.

An ink was made up by mixing the following ingredients in a ball mill.

|  | parts by weight |
|---|---|
| Nitrocellulose (70% in IMS) (DLX 3/5) | 8.65 |
| Polyamide resin (Versamid 793) | 12.88 |
| TiO$_2$ pigment (TIOXIDE R-HD2) | 34.21 |
| Propan-1-ol | 11.07 |
| Industrial Methylated Spirits | 20.72 |
| Ethyl acetate | 12.27 |
| Dispersant | 0.20 |
|  | 100.00 |

Versamid 793 supplied by Cray Valley Products Ltd.

To 100 parts by weight of the above ink was added 3 parts by weight of the organozirconium compound prepared as above. Testing was carried out in a similar manner to that described in Example 1. Again the modified ink exhibited improved adhesion and heat resisting properties.

EXAMPLE 3

An organozirconium compound was prepared in a manner similar to that described in Example 1 but using 440 g of tetra-n-propyl zirconate and 325 g of ethyl acetoacetate.

An ink was made up to the same formulation as that given in Example 2.

To 100 parts by weight of the above ink was added 3 parts by weight of the organozirconium compound prepared as above. Testing was carried out in a similar manner to that described in Example 1. Again the modified ink exhibited improved adhesion and heat resisting properties.

I claim:

1. A printing ink comprising a polymeric binder, a solvent therefor and an adhesion promoting agent comprising the reaction product of a zirconium orthoester and ethyl acetoacetate in which the molar ratio of zirconium to ethyl acetoacetate is from 1:1 to 1:4.

2. A printing ink according to claim 1 in which the polymeric binder is selected from the group consisting of nitrocellulose and cellulose ester derivative.

3. A printing ink according to claim 2 in which the polymeric binder further comprises a binder selected from the group consisting of polyamides and polyurethanes.

4. A printing ink according to claim 1 in which the polymeric binder is nitrocellulose having a nitrogen content between 10.7 and 11.2 percent by weight.

5. A printing ink according to claim 1 in which the solvent is selected from the group consisting of alcohols and esters.

6. A printing ink according to claim 1 in which the zirconium orthoester has the formula $Zr(OR)_4$ in which R represents an alkyl group or an alkoxyalkyl group containing up to 8 carbon atoms.

7. A printing ink according to claim 6 in which R contains up to 4 carbon atoms.

8. A printing ink according to claim 7 in which the zirconium orthoester is selected from the group consisting of tetraisopropoxy zirconium, tetra-n-propoxy zirconium, tetra-n-butoxy zirconium and tetrakis (2-ethoxyethoxy) zirconium.

9. A printing ink according to claim 1 in which the zirconium orthoester is an ester of more than one alcohol.

10. A printing ink according to claim 1 in which the molar ratio of zirconium to ethyl acetoacetate is from 1:1.5 to 1:3.

11. A printing ink according to claim 10 in which the molar ratio of zirconium to ethyl acetoacetate is from 1:2 to 1:2.5.

12. A printing ink according to claim 1 in which the adhesion promoting agent comprises a reaction product from which by-product alcohol has been removed.

13. A printing ink according to claim 1 in which the adhesion promoting agent is prepared in the presence of a solvent.

14. A priming ink according to claim 1 in which the adhesion promoting agent is present in an amount up to 10 percent by weight.

15. A printing ink according to claim 1 in which the adhesion promoting agent is present in an amount between 1 and 6 percent by weight.

16. A printing ink according to claim 1 in which the adhesion promoting agent is present in an amount between 2 and 4 percent by weight.

17. A printing ink according to claim 1 additionally comprising one or more additives selected from dyes and pigments.

18. A printing ink according to claim 17 which contains an organic dye and an opacifying white pigment.

* * * * *